United States Patent [19]

Peninger

[11] Patent Number: 4,859,365

[45] Date of Patent: Aug. 22, 1989

[54] FLAME RETARDANT AND SMOKE SUPPRESSANT COMPOSITION

[75] Inventor: Robert H. Peninger, Mineral Wells, Tex.

[73] Assignee: Manufacturers Industrial Technology, Inc., Chicago, Ill.

[21] Appl. No.: 12,883

[22] Filed: Feb. 10, 1987

[51] Int. Cl.$^4$ .................. C09K 21/00; C09D 5/16; C08L 67/00; C08L 67/06

[52] U.S. Cl. .................. 252/601; 106/18.18; 106/18.31; 252/602; 252/609; 523/506; 524/408; 524/409; 524/414; 524/431; 524/398; 525/17; 525/48

[58] Field of Search .......... 252/601, 602, 609, 186.23, 252/186.26; 521/98, 906, 907; 106/18.11, 18.14, 18.18, 18.24, 18.31; 428/920, 921; 525/17, 48; 524/408, 409, 414, 431, 398; 523/506

[56] References Cited

U.S. PATENT DOCUMENTS

| | | | |
|---|---|---|---|
| 2,949,432 | 8/1960 | Tarkington et al. | 260/30.6 |
| 3,560,253 | 2/1971 | Ashton | 117/123 |
| 3,741,929 | 6/1973 | Burton | 260/40 R |
| 3,904,570 | 9/1975 | Jin | 260/DIG. 24 |
| 3,954,908 | 5/1976 | Nakamura et al. | 260/878 R |
| 3,983,185 | 9/1976 | Dorfman et al. | 260/863 |
| 3,993,607 | 11/1976 | Florence | 260/DIG. 24 |
| 4,013,815 | 3/1977 | Dorfman et al. | 525/10 |
| 4,031,054 | 6/1977 | Jin | 260/DIG. 24 |
| 4,034,136 | 7/1977 | Wright et al. | 525/390 |
| 4,160,758 | 7/1979 | Gardner | 525/168 |
| 4,160,759 | 7/1979 | Gardner et al. | 525/168 |
| 4,172,858 | 10/1979 | Clubley et al. | 525/2 |
| 4,182,799 | 1/1980 | Rodish | 521/98 |
| 4,194,072 | 3/1980 | Chang et al. | 525/432 |
| 4,246,359 | 1/1981 | Whelan | 521/92 |
| 4,248,976 | 2/1981 | Clubley et al. | 525/2 |
| 4,421,890 | 12/1983 | MacKenzie et al. | 524/431 |
| 4,490,498 | 12/1984 | Yokota et al. | 524/371 |

OTHER PUBLICATIONS

Hawley, G. 1981, The Condensed Chemical Dictionary–10th edition, Van Nostrand Reinhold Co., New York, pp. 1039–1056.

Williams, Flame Retardant Coatings and Building Materials; Park Ridge, NJ: Noyes Data Corporation, 1974, pp. 99–101, 233–234.

Primary Examiner—Howard J. Locker
Attorney, Agent, or Firm—Warren B. Kice

[57] ABSTRACT

A flame retardant and smoke suppressant composition which, when admixed with a catalytic amount of a catalyst, such as methyl ethyl ketone peroxide, is curable on a substrate at ambient temperature. The composition comprises:

(a) from about 20 to about 60 weight percent of an unsaturated polyester resin;
(b) from about 2.5 to about 10 weight percent of an unsaturated monomer compatible with the polyester resin;
(c) from about 2.5 to about 18 weight percent of antimony oxide;
(d) from about 4 to about 15 weight percent iron oxide;
(e) from about 30 to about 70 weight percent hydrated alumina; and
(f) from about 1 to about 10 weight percent of a trialkyl phosphate.

20 Claims, No Drawings

FLAME RETARDANT AND SMOKE SUPPRESSANT COMPOSITION

BACKGROUND OF THE INVENTION

1. Field of the Invention

The present invention relates generally to resinous compositions, and more particularly, but not by way of limitation, to resinous compositions having improved flame retardant and smoke suppressant properties.

2. Brief Description of the Prior Art

Resinous or polymeric compositions have heretofore been employed as flame retardants for electrical components, nylon, foamed polystyrene, masonry structured units and many other substrates. For example, fire resistant polymeric coatings have been formulated by curing a thermal setting composition containing hydrated alumina, an unsaturated polyester, and a monomeric compound copolymerizable with the polyester. Similarly, flame retardant additives for foamed polystyrene have been formulated of a halogenated hydrocarbons and chloro-aliphatic hydrocarbons, antimony oxide, zinc borate and hydrated alumina.

Numerous other compositions and systems have been proposed in the prior art to improve the fire or flame resistance of substances, including combinations of halogenated resins and antimony compounds, as well as the use of tin and zinc compounds as a substitute or supplement for the antimony compounds. While many of such compositions have improved the flame resistant properties of the substrated on which such substances are applied, the need has nevertheless remained for improved flame retardant and smoke suppressant compositions, especially compositions which can be effectively cured at ambient temperature, that is, the composition can be applied to a substrate without the requirement of the substrate being subjected to elevated temperatures to set or cure the flame or fire resistant composition. It is to such a composition that the present invention is directed.

SUMMARY OF THE INVENTION

According to the present invention an improved flame retardant and smoke suppressant composition which, upon application to a substrate, is rendered curable at ambient temperatures by admixture therewith of an effective minor amount of a catalyst, such as methyl ethyl ketone peroxide, prior to application of the composition to the substrate. Broadly, the composition comprises:
(a) from about 20 to about 60 weight percent of an unsaturated polyester resin;
(b) from about 2.5 to about 10 weight percent of an unsaturated monomer cmmpatible with the polyester resin;
(c) from about 2.5 to about 18 weight percent of antimony oxide;
(d) from about 4 to about 15 weight percent iron oxide;
(e) from about 30 to about 70 weight percent hydrated alumina; and
(f) from about 1 to about 10 weight percent of a trialkyl phosphate.

In one aspect, the composition of the present invention further comprises from about 2 to about 15 weight percent of barium metaborate monohydrate and from about 0.02 to 3 weight percent of a glycol.

The flame retardant and smoke suppressant compositions of the present invention, when compounded utilizing the above-identified constituents and admixed in a specified sequence, provided a unique resin useful with spray-up equipment for producing substrates having exceptional flame retardance and smoke suppressant characteristics.

An object of the present invention is to provide an improved flame retardant and smoke suppressant composition.

Another object of the invention, while achieving the before-stated object, is to provide an effective and economical flame retardant and smoke suppressant composition which can be applied to a substrate and cured or set without the use of elevated curing temperatures.

Another object of the present invention is to provide a resinous composition having improved flame retardance and smoke suppressant characteristics which can be applied to a substrate with conventional spray-up equipment.

Other objects, advantages and features of the present invention will become clear from the following detailed description when read in conjunction with the appended claims.

DESCRIPTION

The flame retardant and smoke suppressant compositions of the subject invention are resinous based compositions which are curable at ambient temperatures upon admixture with a catalytic amount of a catalyst capable of cross-linking or curing the resinous constituents. However, desirable results have been obtained wherein the catalyst is methyl ethyl ketone peroxide, and the catalyst is admixed with the resinous composition just prior to application of the composition to a substrate.

The amount of the catalyst required to cross-link or cure the resinous constituents can vary widely, and will be dependent to a large degree upon the amount of each of the resinous constituents present in the formulation of the flame retardant and smoke suppressant composition. Generally, however, the amount of catalyst required to cross link or cure the resinous constituents, especially when methyl ethyl ketone peroxide is employed as the catalyst, is from about 2 to about 3 weight percent, based on the total weight of the flame retardant and smoke suppressant composition.

The flame retardant and smoke suppressant compositions which are curable upon admixture of a catalytic amount of a catalyst capable of cross-linking or curing the resinous constituent of composition at ambient temperature, comprise:
(a) from about 20 to about 60 weight percent of an unsaturated polyester resin;
(b) from about 2.5 to about 10 weight percent of an unsaturated monomer compatible with the polyester resin;
(c) from about 2.5 to about 18 weight percent antimony oxide;
(d) from about 4 to about 15 weight percent iron oxide;
(e) from about 30 to about 70 weight percent hydrated alumina; and
(f) from about 1 to about 10 weight percent of a trialkyl phosphate.

Unsaturated polyester resins useful in the invention are those commonly known in the art, and are generally the reaction product of a polycarboxylic compound and a polyhydric alcohol. The polycarboxylic compounds useful in the production of the unsaturated polyester resins include polycarboxylic acids, polycarboxylic anhydrides, polycarboxylic acid halides and polycarboxylic acid esters. The unsaturation in the polyester resin can be provided by either the polycarboxylic compound, the polyhydric alcohol, or both. Typical unsaturated polycarboxylic acids having aliphatic carbon-to-carbon double bonds, and the corresponding esters and anhydrides include maleic, fumaric, chloromaleic, ethylmaleic, itaconic, citraconic, zeronic and acetylene dicarboxylic, and mixtures thereof.

Illustrative of unsaturated polyhydric alcohols which can be used in providing the unsaturation in the polyester molecules, that is, alcohols having aliphatic carbon-to-carbon double bonds, are compounds such as butene diol, pentene diol, unsaturated hydroxy ethers such allyl or vinyl glycerol ethers, allyl or vinyl pentaerythritol ethers and the like.

The saturated polycarboxylic compound can be aliphatic, cycloaliphatic, aromatic or heterocyclic. Illustrative of such saturated polycarboxylic compounds are polycarboxylic acid, acid halides, acid anhydrides and acid esters, including phthalic, isophthalic, terephthalic, tetrachlorophthalic, tetrabromophthalic, adipic, succinic, and mixtures thereof.

When employing a saturated polyhydric alcohol in the preparation of the unsaturated polyester resins, suitable saturated polyhydric alcohols include ethylene glycol, diethylene glycol, propylene glycol, dipropylene glycol, butanediol, pentanediol, hexanediol, neopentyl glycol, 1,4-cyclohexane dimethanol, glycerol, sorbitol, bisphenols, substituted bisphenols, hydrogenated bisphenols, and mixtures thereof.

From the above, it becomes apparent that the properties of the polyester can be varied by using mixtures of the various types of acids and the alcohols, such as unsaturated acid, saturated acid, and saturated alcohol. However, it should be noted that in producing the unsaturated polyester resinous compositions useful in the present invention care must be exercised to insure that the unsaturated polyester resin and the unsaturated monomer are compatible, and that the catalyst is capable of cross-linking or curing the polymeric constituents of the composition at ambient temperatures.

The unsaturated polyester resins useful in the formulation of the flame retardant and smoke suppressant composition of the present invention generally will desirably contain up to about 40 weight percent or more of halogen based on the weight of the unsaturated polyester resin. Desirably the halogen is chlorine or bromine.

Examples of unsaturated polyester resins prepared from polycarboxylic compounds and polyhydric alcohols include a halogenated polyester resin made from propylene glycol, diethylene glycol, maleic anhydride and isophthalic acid; a halogenated polyester resin made from propylene glycol, phthalic anhydride and maleic anhydride; a halogenated polyester resin based on a 2,2 bis-(4-hydroxyphenyl)-propane; hydroquinone, resorcinol, and the like.

It should be noted that unsaturated polyester resins are well known in the art and are commercially available. Thus, it is believed that the above clearly sets forth illustrative examples as to the term "unsaturated polyester resins" which will enable those skilled in the art to duplicate and repeat the invention as set forth herein.

The unsaturated polyester resin component of the flame retardant and smoke suppressant composition of the invention is admixed with an unsaturated monomer which is compatible with the unsaturated polyester resin. Illustrative of such unsaturated monomers are acrylic compounds, such as acrylic acid, methacrylic acid, esters thereof and mixtures of such acrylic compounds. Typical of esters of acrylic acid and methacrylic acid that may be employed are the alkyl esters, such as methyl acrylate, methyl methacrylate, ethyl acrylate, ethyl methacrylate, propyl acrylate, propyl methacrylate, butyl acrylate, butyl methacrylate, tert-butyl acrylate, tert-butyl methacrylate, 2-ethylbutyl acrylate, 2-ethylbutyl methacrylate, and the like; hydroxyalkyl acrylates and methacrylates, such as hydroxymethyl acrylate, hydroxymethyl methacrylate, hydroxyethyl methacrylate, hydroxypropyl acrylate, hydroxypropyl methacrylate, hydroxybutyl methacrylate, hydroxyoctyl acrylate, and the like; and alkoxy acrylates and methacrylates, such as 2-ethoxyethyl acrylate, 2-ethoxyethyl methacrylate, 2-n-butoxyethyl acrylate, 2-n-butoxyethyl methacrylate, and mixtures of such compounds. Other suitable acrylic compounds include aromatic esters of acrylic and methacrylic acid such as benzyl acrylate, phenyl acrylate, and the like as well as the corresponding methacrylates.

The antimony constituent of the flame retardant and smoke suppressant composition can be any suitable antimony compound dispersible in finely divided form in the unsaturated polyester and the unsaturated monomer. Illustrative of such antimony compounds are antimony trioxide, antimony tetraoxide, antimony pentaoxide, antimony silico-oxide, and other inorganic compounds of antimony, such as antimony sulfides including antimony tribromide, antimony tetrachloride, antimony trioxide, and the like.

The iron oxides which can be used in the practice of the invention include $Fe_2O_3$, $Fe_3O_4$, $FeO$. As used herein, the term ferric oxide implies $Fe_2O_3$ in its various polymorphic forms and hydrates, such as yellow iron oxide and red iron oxide.

The hydrated alumina employed in formulation of the flame retardant and smoke suppressant composition should be finely divided so as to maximize stability of the flame retardant and smoke suppressant composition, as well as to insure substantially uniform dispersement of the hydrated alumina throughout the composition.

Hydrated alumina is a composition generally indicated by the formula $Al_2O_3 3H_2O$ or $Al(OH)_3$. Thus, on a weight basis hydrated alumina contains about 65 percent aluminum oxide and about 35 percent water. Commercially available grades of hydrated alumina can be employed in the practice of the present invention, such as hydrated alumina C-230 sold by Alcoa Chemical Division of Aluminum Company of America.

The trialkyl phosphates useful in the formulation of the flame retardant and smoke suppressant compositions of the present invention contain from 2 to about 16 carbon atoms in the alkyl moieties, and more desirably from about 2 to 6. Examples of such trialkyl phosphates include triethyl phosphate, tributyl phosphate, trihexyl phosphate, tridecyl phosphate, tri(2-ethylhexyl) phosphate, trioctyl phosphate, hexyldioctyl phosphate, and the like.

The flame retardant and smoke suppressant composition of the present invention, when compounded utilizing the above-identified components, provides a fluid resinous composition which, when admixed with catalytic amount of a curing catalyst such as methyl ethyl ketone peroxide, results in a self-curing formulation. Further, the composition, upon application to a substrate, provides the substrate with exceptional flame retardance and smoke suppressant characteristics. Because one does not have to employ heat to cure or cross-link the resinous constituents of the composition, the composition is enhanced by the wide apolication of the flame retardant and smoke suppressant composition to a variety of substrates. Further, the composition of the present invention can be applied with conventional spray-up equipment, or painted or rolled on a substrate using conventional rollers and brushes. When using conventional rollers and brushes, the catalyst for the resinous composition should be admixed with the composition just prior to application to the substrate.

In order to further improve the flame retardant and smoke suppressant properties of the composition of the present invention, one may desire to further incorporate from about 2.5 to about 15 weight percent of a secondary flame retardant additive, such as barium metaborate monohydrate, and from about 0.02 to about 3 weight percent of a levelling agent, such as glycol. Typical of such glycols which can be employed as a levelling agent for the flame retardant and smoke suppressant compositions of the present invention are ethylene glycol, propylene glycol and mixtures thereof.

The flame retardant and smoke suppressant composition of the present invention can be compounded in conventional mixing or blending equipment, such as a ribbon blender, having a capability of operating at from about 1 to about 100 rpm so that sufficient shear can be imparted to the components during mixing and formulation to insure substantially uniform dispersement of each of the components throughout the base resin, that is, the unsaturated polyester constituent. The blender or mixing equipment should desirably be provided with a variable control so that as the viscosity of the composition increases due to the sequential addition of the constituents the speed of the mixing element of the blending vessel can be adjusted to insure proper mixing is maintained and to provide the desired shear on the constituents during compounding. Further, it is believed that the mixing sequence of the constituents in the formulation of the flame retardant and smoke suppressant compositions of the present invention is important. Thus, the mixing sequence and procedures in compounding the composition of the present invention will now be set forth.

Initially, each of the components or constituents utilized in the formulation of the flame retardant and smoke suppressant composition are selected and carefully weighted to insure that the composition contains the desired amount of each of the constituents. Thereafter, the constituents are introduced into blending equipment in the following sequence.

The base resin, that is, the unsaturated polyester resin, is introduced into the mixing vessel and subjected to agitation. Antimony oxide and iron oxide, each in finely divided form, are then introduced into the mixing vessel and substantially uniformly dispersed throughout the unsaturated polyester resin. Care should be taken to insure that the antimony oxide and iron oxide do not lump or produce clusters in the unsaturated polyester resin. The unsaturated monomer is then introduced into the mixing vessel containing the uniform mixture of the base resin, the antimony oxide and the iron oxide. The unsaturated monomer functions to thin the base resin and thus make the resulting mixture more fluid.

After the monomer has been thoroughly admixed with the base resin the hydrated alumina is sifted gradually into the vortex of the liquid in the mixer, and the blender speed is increased as the viscosity of the mixture increases. Mixing is continued to insure substantially complete and uniform dispersement of each of the before-stated constituents in the base resin. If desired, an additional flame retardant additive, such as barium metaborate monohydrate, can be added to the mixture. In such instance the barium metaborate monohydrate is incorporated in the same manner as the hydrated alumina, that is, it is sifted gradually into the vortex of the liquid created by the blender, and the mixer speed is increased as the viscosity builds.

After at least about thirty minutes mixing time, a time required to insure the complete dispersion of the constituents in the unsaturated polyester resin, the trialkyl phosphate constituent is added to the mixture and mixing is continued for at least about ten minutes. If a levelling agent, such as propylene glycol, is incorporated into the composition, the propylene glycol is introduced either prior to or immediately after the addition of the trialkyl phosphate.

Once the composition has been formulated as specified above, the formulation can be stored in containers at ambient temperature. However, when applied to the substrate, and incorporation into the composition of the hereinbefore specified amount of catalyst or promoter, the resinous compositions of the invention can be cured or set on the substrate at ambient temperatures. The time required for the composition to cure at ambient temperatures will vary widely, depending to a large degree upon the thickness of the coating of the composition applied to the substrate. However, in most instances, the curing can be effected at ambient temperature in a time period of from about 24 to 72 hours. Thus, the flame retardant and smoke suppressant composition of the present invention provides a wider application of such composition to substrates than heretofore achieved. Further, the unique flame retardant and smoke suppressant composition can be applied with conventional equipment and the products having such composition applied thereto exhibit exceptional flame retardance and smoke suppressant characteristics.

In order to more fully describe the present invention the following examples are set forth. However, it is to be understood that the examples are for illustrative purposes and are not to be construed as limiting the scope of the present invention as defined in the appended claims.

EXAMPLE I

Preparation of Flame Retardant and Smoke Suppressant Compositions 500 pounds of an unsaturated halogenated polyester resin (FR 6657, manufactured and distributed by Koppers Company, Inc. of Irving, Tex.) was introduced into a mixing vessel. 20 pounds of antimony oxide and 35 pounds of ferric oxide were then added to the unsaturated polyester resin, care being taken to avoid lumping. 30 pounds of methyl methacrylate monomer was then added to the mixing vessel to thin the unsaturated polyester resin. 570 pounds of alumina trihydrate was then sifted gradually into the vortex of the liquid mixture and the mixer speed was increased to 70 rpm as the viscosity of the mixture in the vessel increased. Mixing was continued at the increased mixing speed for 30 minutes to insure complete dispersement of the alumina trihydrate, the methyl methacrylate monomer, the antimony oxide and the ferric oxide in the unsaturated polyester resin.

At the end of the 30 minutes mixing period 6 pounds of triethyl phosphate was added and mixing was continued at about 70 rpm for 10 minutes.

The composition so produced was then removed from the vessel and placed in a storage container. The flame retardant and smoke suppressant composition so produced thus contained the following weight percentages of each of the components:

| | |
|---|---|
| Unsaturated polyester resin | 24.8% |
| Methyl methacrylate monomer | 6.0% |
| Antimony oxide | 4.0% |
| Ferric oxide | 7.0% |
| Triethyl phosphate | 1.2% |
| Aluminum trihydrate | 57.0% |

EXAMPLE II

A substrate was selected consisting of polyisocyanurate foam insulation sandwiched between 2 nominal 3/16 inch thick polyester-reinforced fiberglass sheets. The foam insulation was internally reinforced with glass fiber fabric. Decorative aggregate was bonded to one side of the substrate, that is, to one of the polyester-reinforced fiberglass sheets with the flame retardant and smoke suppressant composition of Example I. In applying the flame retardant and smoke suppressant composition to each side of the substrate, a spray, e.g. conventional spray-up equipment, was utilized and 2.5 percent of methyl ethyl ketone peroxide was injected into the flame retardant and smoke suppressant composition exiting the spray gun. The resulting mixture consisting of the before-described composition and methyl ethyl ketone peroxide was uniformly applied to the polyester-reinforced fiberglass sheets. The substrate was then allowed to cure at ambient temperatures for a period of about 48–72 hours.

EXAMPLE III

An experiment was conducted on a 4'×4' specimen of the substrate of Example II to determine the flame retardant and smoke suppressant characteristics of the composition prepared in accordance with the procedures of Example I. The test was carried out in accordance with the procedures of ASTM E119-80, with the exception that no hose stream test was performed.

The test specimen was mounted at the center of a steel frame placed in front of a wall furnace, and the edges of the specimen were protected with mineral fiber blanket insulation. The remainder of the steel frame enclosure was closed off with two layers of 5"×8" type X gypsum wall board to form a wall capable of remaining in place for at least one hour. Five thermocouples were placed on the unexposed side of the wall specimen, and nine thermocouples were place inside the furnace and 6 inches from the exposed face of the wall assembly to monitor the furnace temperature throughout the exposure period. The furnace was then fired and the specified time-temperature curve followed until the test was ended.

The test was initiated to determine if the specimen could exceed a fire resistance period for 30 minutes. Consequently, no provision was made for performing the hose stream test and the supported wall assembly was constructed of materials capable of remaining in place for a maximum of 60 minutes. The test was stopped at 75 minutes due to degradation of the supporting wall assembly. The test specimen itself, however, showed no visible signs of failure and the average temperature on the unexposed face was 120° F. Failure would have been reached at a temperature of 340° F.

After a 3 hour cooling period, the specimen was removed and found to be completely intact on the unexposed face. The black charred layer extended through all but approximately ½ " of the rigid foam insulation. However, how much smoldering combustion occurred after the test was stopped could not be determined. Further, the specimen, as tested, had not failed when the test was stopped at 75 minutes.

As a result of the above test, it is apparent that the composition of te subject invention has exceptional flame retardant and smoke suppressant characteristics.

EXAMPLE IV

An experiment was conducted to evaluate the performance of a test specimen as prepared in Example II in relation to that of a mineral-fiber-cement board and red oak flooring under similar fire exposure. The experiment was carried out in accordance with the provisions of ASTM designation E84-80, "Standard Method of Test For Surface Burning Characteristics of Building Material". This test method is similar to the test method specified in ANSI E84-75. However, two improvements were incorporated into the current ASTM designation E84-80 procedure, i.e. the stack pressure control tap was relocated to a position forward of the burners and the formulas used to calculate the flame spread was modified which resulted in slightly lower values.

The purpose of the experiment was to evaluate performance of the specimen in relation to that of mineral-fiber-cement board and red oak flooring under similar fire exposure. The results are expressed in terms of flame spread, fuel contribution and smoke development during a 10 minute exposure and are recorded as a ration with mineral-fiber-cement board being 0 and red oak flooring being 100.

A. Preparation and Conditioning of Test Specimen

A 21 inch by 25 foot specimen was prepared by using three nominal 20 inch by 8 foot panels placed end-to-end in the tunnel furnace. A 21×14 inch piece of 16 gauge sheet metal was placed over the burner and under the leading edge of the first section to deter flame impingement on the unexposed surface in accordance with the test procedure. The specimen was conditioned for three days in an atmosphere maintained between 68° F. and 78° F., and at 45 to 55 percent relative humidity.

B. Procedure

The zero reference and other data critical to furnace operation were verified by conducting a 10 minute test using ¼ inch mineral fiber cement board on the day of the test. Periodic calibration checks performed on the 23/32-in select grade red oak flooring provide data for the reference points for both smoke and flamespread.

Having verified the calibration of the test equipment, the test specimens were tested in accordance with the stanaard procedure (ASTM designation E84-80).

C. Results

The test results, computed on the basis of observed flame front advance and electronic smoke density measurements are presented in the following table. In recognition of possible variations and limitations of the test method, the results are computed to the nearest number divisible by five, as outlined in the test method.

TABLE I

| TEST SPECIMEN | FLAME SPREAD INDEX | SMOKE DEVELOPED INDEX |
| --- | --- | --- |
| Mineral-Fiber Cement Board | 0 | 0 |
| Red Oak Flooring | 100 | 100 |
| Glass-Resin-Faced Foam Panel | 15 | 105 |

D. Observation During and After Testing

For the first 2 minutes of test exposure, the panel surface only darkened slightly and ignited at 2:06 (min:sec). The flamefront then moved smoothly to its maximum extension of 11.1 feet, which was reached at 8:47 (min:sec). There was little or no afterburn after the test was over, and the only severe damage was incurred directly over the test flame, at which point the glass fiber resin coating was charred approximately half-way through. The foam under the resin skin was slightly darkened in the vicinity of the test flame, but the skin was not penetrated.

Conclusion

The above experiment clearly indicates the improved flame retardant and smoke suppressant characteristics of the composition of the present invention.

From the above, it is clear that the present invention is well adapted to carry out the objects and to attain the ends and advantages mentioned herein as well as those inherent in the invention. While a preferred embodiment of the invention has been described for purposes of this disclosure, numerous changes can be made which will readily suggest themselves to those skilled in the art and which are encompassed within the spirit and scope of the invention disclosed herein and as defined in the appended claims.

What is claimed is:

1. A flame retardant and smoke suppressant composition comprising:
   from about 20 to 60 weight percent of an unsaturated polyester resin;
   from about 2.5 to about 10 weight percent of an unsaturated monomer compatible with the polyester resin;
   from about 2.5 to about 18 weight percent antimony oxide;
   from about 4 to about 15 weight percent iron oxide;
   from about 30 to about 70 weight percent hydrated alumina; and
   from about 1 to about 10 weight percent of trialkyl phosphate;
   wherein said composition is curable at ambient temperatures upon admixture with a catalytic amount of methyl ethyl ketone peroxide prior to application of the composition to a surface.

2. The flame retardant and smoke suppressant composition of claim 1 wherein the unsaturated monomer is selected from the group consisting of $C_1$ to $C_{20}$ alkyl esters of acrylic and methacrylic acid.

3. The flame retardant and smoke suppressant composition of claim 2 wherein the iron oxide is selected from the group consisting of $Fe_2O_3$, $Fe_3O_4$ and FeO.

4. The flame retardant and smoke suppressant composition of claim 3 wherein the alkyl moieties of the trialkyl phosphate contains from about 2 to about 16 carbon atoms.

5. The flame retardant and smoke suppressant composition of claim 1 further comprising from about 2.5 to about 15 weight percent of barium metaborate monohydrate.

6. The flame retardant and smoke suppressant composition of claim 5 further comprising from about 0.02 to about 3 weight percent of a glycol.

7. The flame retardant and smoke suppressant composition of claim 6 wherein the glycol is propylene glycol.

8. The flame retardant and smoke suppressant composition of claim 1 further comprising from about 0.02 to about 3 percent of a glycol.

9. The flame retardant and smoke suppressant composition of claim 8 wherein the glycol is selected from the group consisting of ethylene glycol, propylene glycol and mixtures thereof.

10. The flame retardant and smoke suppressant composition of claim 1 wherein the catalytic amount of the methyl ethyl ketone peroxide admixed with the composition is an amount of from about 2 to about 3 weight percent, based on the weight of the composition, and wherein the unsaturated polyester resin is a brominated unsaturated polyester resin and is present in the amount of about 24.8 weight percent, the unsaturated monomer is methyl methacrylate and is present in an amount of about 6 weight percent, the antimony oxide is present in an amount of about 4 weight percent, the iron oxide is ferric oxide and is present in an amount of about 7 weight percent, the hydrated alumina is present in the amount of about 57 weight percent, and the trialkyl phosphate is triethyl phosphate and is present in an amount of about 1.2 weight percent.

11. A flame retardant and smoke suppressant composition in accordance with claim 1 wherein the catalytic amount of the methyl ethyl ketone peroxide admixed with the composition is an amount from about 2 to about 3 weight percent based on the weight of the composition.

12. A flame retardant and smoke suppressant composition in accordance with claim 1 wherein said unsaturated polyester resin comprises a reaction product of a polycarboxylic compound and apolyhydric alcohol.

13. A flame retardant and smoke suppressant composition in accordance with claim 12 wherein the unsaturation in the polyester resin is provided by at least one of said polycarboxylic compound and said polyhydric alcohol.

14. A flame retardant and smoke suppressant composition in accordance with claim 13 wherein said polycarboxylic compound is selected from the group consisting of polycarboxylic acids, polycarboxylic anhydrides, polycarboxylic acid halides and polycarboxylic acid esters.

15. The flame retardant and smoke suppressant composition of claim 14 wherein said polycarboxylic compound is selected from the group consisting of phthalic acid, isophtalic acid, terephthalic acid, tetrachlorophthalic acid, tetrabromophthalic acid, adipic acid, succinic acid, maleic acid, fumaric acid, chloromaleic acid ethylmaleic acid, itaconic acid, citraconic acid, zeronic acid, acetylene dicarboxylic acid, and anhydrides, acid halides, esters and mixtures thereof.

16. A flame retardant and smoke suppressant composition in accordance with claim 13 wherein said polyhydric alcohol is selected from the group consisting of ethylene glycol, diethylene glycol, propylene glycol, dipropylene glycol, butanediol, pentanediol, hexanediol, neopentyl glycol, 1,4-cyclohexane dimethanol, glyceral, sorbitol, bisphenols, substituted bisphenoils, hydrogenated bisphenols, butene diol, pentene diol, unsaturated hydroxy ethers and mixtures thereof.

17. A flame retardant and smoke suppressant composition in accordance with claim 16 wherein said unsaturated hydroxy ether is selected from the group consisting of allyl glycerol ethers, vinyl glycerol ethers, allyl pentaerythritol ethers, and vinyl pentaerythritol ethers.

18. A flame retardant and smoke suppressant composition in accordance with claim 2 wherein said unsaturated monomer is selected from the group consisting of methyl acrylate, propyl acrylate, propyl methacrylate, butyl acrylate, butyl methacrylate, tert-butyl acrylate, tert-butyl methacrylate, 2-ethylbutyl acrylate, 2-ethylbutyl methacrylate, hydroxymethyl acrylte, hydroxymethyl methacrylate, hydroxyethyl methacrylate, hydroxpropyl acrylate, hydroxypropyl methacrylate, hydroxybutyl methacrylate, hydroxyoctyl acrylate, 2-ethoxyethyl acrylate, 2-ethoxyethyl methacrylate, 2-n-butoxyethyl acrylate, 2-n-butoxyethyl methacrylate, benzyl acrylate, benzyl methacrylate, phenyl acrylate, phenyl methacrylate, and mixtures thereof.

19. A flame retardant and smoke suppressant composition in accordance with claim 1 wherein said antimony oxide is selected from the group consisting of antimony trioxide, antimony tetraoxide, antimony pentaoxide and antimony silico-oxide.

20. A flame retardant and smoke suppressant composition in accordance with claim 4 wherein said trialkyl phosphate is selected from the group consisting of triethyl phosphate, tributyl phosphate, trihexyl phosphate, tridecyl phosphate, tri(2-ethylhexyl)-phosphate, trioctyl phosphate and hexyldioctyl phosphate.

* * * * *